United States Patent
Ha et al.

(10) Patent No.: US 12,163,066 B2
(45) Date of Patent: Dec. 10, 2024

(54) ELECTRICAL STEEL SHEET AND METHOD FOR MANUFACTURING SAME

(71) Applicant: POSCO, Pohang-si (KR)

(72) Inventors: Bongwoo Ha, Pohang-si (KR);
Jung-Woo Kim, Pohang-si (KR);
Taeyoung No, Pohang-si (KR);
Dong-Gyu Lee, Pohang-si (KR)

(73) Assignee: POSCO Co., Ltd, Pohang-si (KR)

( * ) Notice: Subject to any disclaimer, the term of this patent is extended or adjusted under 35 U.S.C. 154(b) by 868 days.

(21) Appl. No.: 17/297,737

(22) PCT Filed: Nov. 26, 2019

(86) PCT No.: PCT/KR2019/016387
§ 371 (c)(1),
(2) Date: May 27, 2021

(87) PCT Pub. No.: WO2020/111742
PCT Pub. Date: Jun. 4, 2020

(65) Prior Publication Data
US 2022/0041893 A1  Feb. 10, 2022

(30) Foreign Application Priority Data
Nov. 30, 2018 (KR) ......................... 10-2018-0153083

(51) Int. Cl.
*C09J 5/04* (2006.01)
*B32B 7/12* (2006.01)
(Continued)

(52) U.S. Cl.
CPC ............... *C09J 5/04* (2013.01); *B32B 7/12* (2013.01); *B32B 15/011* (2013.01); *B32B 37/12* (2013.01);
(Continued)

(58) Field of Classification Search
CPC . C09J 5/04; C09J 7/28; C09J 2400/166; C09J 2423/04; C09J 2425/00;
(Continued)

(56) References Cited

U.S. PATENT DOCUMENTS 10,920,108 B2 * 2/2021 Suzuki ............... C08L 33/14
11,749,431 B2 * 9/2023 Tanaka ............... C22C 38/06
428/683

(Continued)

FOREIGN PATENT DOCUMENTS

CN    102746725 A   10/2012
CN    103996672 A    8/2014
(Continued)

OTHER PUBLICATIONS

Machine Translation of JP 2000-030923A (Year: 2024).*
(Continued)

*Primary Examiner* — Scott R. Walshon
(74) *Attorney, Agent, or Firm* — Morgan, Lewis & Bockius LLP

(57) ABSTRACT

An embodiment of the present invention provides an electrical steel sheet including: an upper adhesive layer positioned on an upper surface of an electrical steel sheet; and an lower adhesive layer positioned on a lower surface of the electrical steel sheet, wherein the upper adhesive layer has a pencil hardness of F or lower, and the lower adhesive layer has a pencil hardness of H or higher.

13 Claims, 2 Drawing Sheets

(51) Int. Cl.
*B32B 15/01* (2006.01)
*B32B 37/12* (2006.01)
*C09J 7/28* (2018.01)
*H01F 1/147* (2006.01)
*H01F 41/02* (2006.01)

(52) U.S. Cl.
CPC ............... *C09J 7/28* (2018.01); *H01F 1/147* (2013.01); *H01F 41/02* (2013.01); *C09J 2301/1242* (2020.08); *C09J 2400/166* (2013.01); *C09J 2423/04* (2013.01); *C09J 2425/00* (2013.01); *C09J 2433/00* (2013.01); *C09J 2461/00* (2013.01); *C09J 2463/00* (2013.01); *C09J 2467/00* (2013.01); *C09J 2475/00* (2013.01); *C09J 2483/00* (2013.01)

(58) Field of Classification Search
CPC ............... C09J 2433/00; C09J 2461/00; C09J 2463/00; C09J 2467/00; C09J 2475/00; C09J 2483/00; C09J 2301/1242; C09J 2301/314; C09J 2400/163; B32B 7/12; B32B 15/011; B32B 37/12; B32B 2255/06; B32B 2307/584; H01F 1/147; H01F 41/02
See application file for complete search history.

(56) References Cited

U.S. PATENT DOCUMENTS

| | | | |
|---|---|---|---|
| 2007/0087201 A1 | 4/2007 | Wimmer et al. | |
| 2011/0008615 A1 | 1/2011 | Myers | |
| 2017/0117758 A1 | 4/2017 | Nakagawa et al. | |
| 2017/0218231 A1* | 8/2017 | Suzuki .................. | C09J 133/02 |

FOREIGN PATENT DOCUMENTS

| | | |
|---|---|---|
| CN | 113165332 B | 8/2023 |
| JP | H03-35028 A | 2/1991 |
| JP | H03-35029 A | 2/1991 |
| JP | H08-290521 A | 11/1996 |
| JP | H08-323283 A | 12/1996 |
| JP | 2000-030923 A | 1/2000 |
| JP | 2000-336487 A | 12/2000 |
| JP | 3196564 B2 | 8/2001 |
| JP | 3486962 B2 | 1/2004 |
| JP | 3732971 B2 | 1/2006 |
| JP | 2007-076127 A | 3/2007 |
| JP | 2011-213789 A | 1/2011 |
| JP | 2013-203964 A | 10/2013 |
| JP | 2015-193101 A | 11/2015 |
| JP | 2016-009710 A | 1/2016 |
| JP | 6086098 B2 | 3/2017 |
| KR | 10-0698431 B1 | 3/2007 |
| KR | 10-1128156 B1 | 3/2012 |
| KR | 10-1439506 B1 | 9/2014 |
| KR | 10-2015-0061472 A | 6/2015 |
| KR | 10-1532015 B1 | 6/2015 |
| KR | 2015-0061472 A | 6/2015 |
| KR | 10-2015-0074817 A | 7/2015 |
| KR | 2015-0074817 A | 7/2015 |
| KR | 10-2017-0075527 A | 7/2017 |
| KR | 10-1904306 B1 | 10/2018 |
| KR | 10-2176342 B1 | 11/2020 |
| KR | 10-2223865 B1 | 3/2021 |

OTHER PUBLICATIONS

Indian Office Action dated Feb. 24, 2022 issued in Indian Patent Application No. 202137025892 (English translation).

Extended European Search Report dated Jan. 4, 2022 issued in European Patent Application No. 19888551.9.

International Search Report issued in PCT/KR2019/016387, dated Jul. 27, 2020.

Written Opinion and International Search Report dated Jul. 27, 2020 issued in International Patent Application No. PCT/KR2019/016387 (with English translation).

X. Kong, et al. "Preparation method of phosphating and environmentally protective insulating coating for non-oriented electrical steel," Journal of University of Science and Technology Bejing, vol. 29, Suppl. 2, Dec. 2007 (Partial English translation).

European Communication dated May 15, 2024 issued European Patent Application No. 19888551.9.

* cited by examiner

ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/016387, filed on Nov. 26, 2019, which claims the benefit of Korean Patent Application No. 10-2018-0153083, filed on Nov. 30, 2018, the entire disclosures of each are incorporated by reference herein.

TECHNICAL FIELD

The present invention relates to an electrical steel sheet and a manufacturing method thereof. More specifically, the present invention relates to an electrical steel sheet and a manufacturing method thereof that may secure excellent adhesion and surface characteristics by forming different kinds of adhesive layers on upper and lower surfaces of the electrical steel sheet.

BACKGROUND ART

Electrical steel is a product used as a material for transformers, motors, and electric machines, and unlike general carbon steel, which places importance on workability such as mechanical characteristics, it is a functional product that places importance on electric characteristics. The required electric characteristics include low iron loss, high magnetic flux density, high magnetic permeability, and a high stacking factor.

The electrical steel sheet is classified into a grain-oriented electrical steel sheets and a non-oriented electrical steel sheet. The grain-oriented electrical steel sheet has excellent magnetic characteristics in a rolling direction by forming a Goss texture ({110}<001> texture) on an entire steel sheet by using an abnormal grain growth phenomenon called secondary recrystallization. The non-oriented electrical steel sheet is an electrical steel sheet with uniform magnetic characteristics in all directions on a rolled sheet.

The electrical steel sheet may be classified into two types, such as one in which stress-removing annealing (SRA) for improving the magnetic characteristic after punching work should be practiced, and the other in which the SRA is omitted if a cost loss is larger than the effect of the magnetic characteristic by the SRA.

On the other hand, insulating film formation is a process that corresponds to the finishing manufacturing process of a product, when punching into a predetermined shape and stacking a number of them to make an iron core in addition to the electrical characteristics that generally inhibit the occurrence of eddy currents, it requires continuous punching processability to inhibit abrasion of the mold, and sticking resistance and surface adhesion in which core steel sheets do not closely contact each other after the SRA process, which recovers magnetic characteristics by removing processing stress of steel sheets. In addition to these characteristics, excellent coating workability of a coating solution and stability of a solution that may be used for a long time after mixing are also required.

In addition, an adhesive coating layer capable of bonding (fastening) electrical steel sheets without using conventional fastening methods such as welding, clamping, and interlocking is also known.

DISCLOSURE

An electrical steel sheet and a manufacturing method thereof are provided. More specifically, an electrical steel sheet and a manufacturing method thereof that may secure excellent adhesion and surface characteristics by forming different kinds of adhesive layers on upper and lower surfaces of the electrical steel sheet are provided.

An embodiment of the present invention provides an electrical steel sheet including: an upper adhesive layer positioned on an upper surface of an electrical steel sheet; and an lower adhesive layer positioned on a lower surface of the electrical steel sheet, wherein the upper adhesive layer has a pencil hardness of F or lower, and the lower adhesive layer has a pencil hardness of H or higher.

The upper adhesive layer may include a resin having a hydroxyl group equivalent of 1 to 10 mgKOH/g, and the lower adhesive layer may include a resin having a hydroxyl group equivalent of 15 to 20 mgKOH/g.

The upper adhesive layer may include a resin having a weight average molecular weight of 15000 to 50,000, and the lower adhesive layer may include a resin having a weight average molecular weight of 1000 to 10,000.

The upper adhesive layer may further include a hardener of 3 wt % or less, and the lower adhesive layer may further include a hardener of 5 to 10 wt %.

The upper adhesive layer may have a pencil hardness of F or lower, and the lower adhesive layer may have a pencil hardness of H or higher.

The resin may include one or more of an epoxy-based resin, a siloxane-based resin, an acryl-based resin, a phenolic resin, a styrene-based resin, a vinyl-based resin, an ethylene-based resin, an ester-based resin, and a urethane-based resin.

The hardener may include one or more of a melamine-based hardener, a urethane-based hardener, an aliphatic polyamine hardener, a modified aliphatic polyamine hardener, an aromatic polyamine hardener, and an organic acid anhydride hardener.

Another embodiment of the present invention provides a manufacturing method of an electrical steel sheet, including: applying an upper adhesive composition to an upper surface of an electrical steel sheet to form an upper adhesive layer; and applying a lower adhesive composition to a lower surface of the electrical steel sheet to form a lower adhesive layer, wherein the upper adhesive composition includes a resin having a hydroxyl group equivalent of 1 to 10 mgKOH/g, and the lower adhesive composition includes a resin having a hydroxyl group equivalent of 15 to 20 mgKOH/g.

The upper adhesive composition may include a resin having a weight average molecular weight of 15000 to 50,000, and the lower adhesive composition may include a resin having a weight average molecular weight of 1000 to 10,000.

The upper adhesive composition may further include 3 wt % or less of a hardener with respect to 100 wt % of a solid content, and the lower adhesive composition may further include 5 to 10 wt % of a hardener with respect to 100 wt % of a solid content.

Another embodiment of the present invention provides an electrical steel sheet laminate in which a plurality of electrical steel sheets are stacked, and an upper adhesive layer and a lower adhesive layer are interposed in an order between the electrical steel sheets.

The upper adhesive layer may have a pencil hardness of F or lower, and the lower adhesive layer may have a pencil hardness of H or higher.

The upper adhesive layer may include a resin having a weight average molecular weight of 15,000 to 50,000, and the lower adhesive layer may include a resin having a weight average molecular weight of 1000 to 10,000.

The upper adhesive layer may further include a hardener of 3 wt % or less, and the lower adhesive layer may further include a hardener of 5 to 10 wt %.

The upper adhesive layer may include a resin having a hydroxyl group equivalent of 1 to 10 mgKOH/g, and the lower adhesive layer may include a resin having a hydroxyl group equivalent of 15 to 20 mgKOH/g.

According to the embodiment of the present invention, it is possible to secure excellent surface characteristic and adherence.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Therefore, a first part, component, area, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
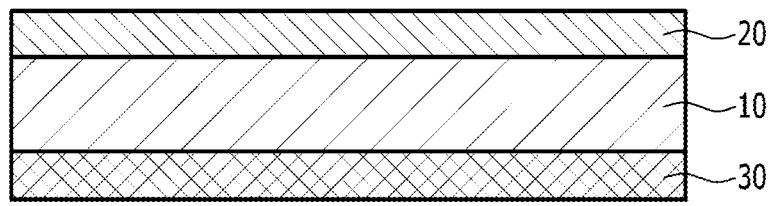
FIG. 1 illustrates a schematic view of a cross-section of an electrical steel sheet according to an embodiment of the present invention.

FIG. 1 illustrates a schematic view of a cross-section of an electrical steel sheet according to an embodiment of the present invention. A structure of an electrical steel sheet according to an embodiment of the present invention will be described with reference to FIG. 1. However, the electrical steel sheet of FIG. 1 is only for illustrating the present invention, and the present invention is not limited thereto. Therefore, a structure of the electrical steel sheet may be variously modified.

As shown in FIG. 1, the electrical steel sheet according to the embodiment of the present invention includes an upper adhesive layer 20 positioned on an upper surface of an electrical steel sheet 10 and a lower adhesive layer 30 positioned on a lower surface of the electrical steel sheet 10.

The electrical steel sheet 10 may be a non-oriented electrical steel sheet or a grain-oriented electrical steel sheet. In the embodiment of the present invention, an alloy component of the electrical steel sheet 10 may be used without limitation. For example, the electrical steel sheet 10 may include: in wt %, C at 0.1% or less, Si at 6.0% or less, P at 0.5% or less, S at 0.005% or less, Mn at 1.0% or less, Al at 2.0% or less, N at 0.005% or less, Ti at 0.005% or less, Cr at 0.5% or less, and the balance of Fe and inevitable impurities.

The upper adhesive layer 20 is positioned on the upper surface of the electrical steel sheet 10.

The upper adhesive layer 20 includes a resin having a hydroxyl group equivalent of 1 to 10 mgKOH/g. When the resin includes an appropriate amount of a hydroxyl group, and when manufacturing a laminate 100 by laminating the electrical steel sheet 10, adherence to the lower adhesive layer 30 may be improved. By improving the adherence, it is possible to bond electrical steel sheets without using conventional fastening methods such as welding, clamping, and interlocking, and magnetism is improved because no deformation is added to the steel sheets.

When the hydroxyl group equivalent is too high, the adherence to the lower adhesive layer 30 may be deteriorated. When the hydroxyl group equivalent is too low, a defect may occur in which the upper adhesive layer 20 and the lower adhesive layer 30 are adhered by coil winding after production of the product. More specifically, the upper adhesive layer 20 may include a resin having a hydroxyl group equivalent of 3 to 5 mgKOH/g. In this case, the hydroxyl group (—OH) equivalent means a weight of a hydroxyl group (—OH) to a weight of the resin, and 1 g of a dried solid content is obtained from a weight of KOH required to neutralize an acid value that may be acetylated.

The upper adhesive layer 20 may include a resin having a weight average molecular weight of 15,000 to 50,000. When a resin with an appropriate molecular weight is included, adherence to the lower adhesive layer 30 may be improved. When the weight average molecular weight is too low, the adherence to the lower adhesive layer 30 may be deteriorated. When the weight average molecular weight is too high, a defect may occur in which the upper adhesive layer 20 and the lower adhesive layer 30 are adhered by coil winding after production of the product. More specifically, the upper adhesive layer 20 may include a resin having a weight average molecular weight of 20,000 to 40,000.

The upper adhesive layer 20 may further include 3 wt % or less of a hardener. The hardener may be 0 wt %, that is, it may not be included. When too much hardener is included, the adherence to the lower adhesive layer 30 may be deteriorated. The balance, excluding the hardener, may be the resin. More specifically, the hardener may not be included. That is, the upper adhesive layer 20 may be configured of only resin.

The upper adhesive layer 20 may have a pencil hardness of F or less. Here, the pencil hardness may be measured by visually checking presence or absence of an indentation on a surface of a coating layer by drawing a line at a 45 degree angle with a load of 500 g by using a standard pencil. The highest hardness that does not cause the indentation is a hardness of the adhesive layer. More specifically, the upper adhesive layer 20 may have a pencil hardness of B to F.

The kind of resin is not particularly limited. For example, the resin may include one or more of an epoxy-based resin, a siloxane-based resin, an acryl-based resin, a phenolic resin, a styrene-based resin, a vinyl-based resin, an ethylene-based resin, an ester-based resin, and a urethane-based resin. More specifically, it may include one or more of an epoxy-based resin, an ester-based resin, a urethane-based resin, and an acryl-based resin.

The hardener may include one or more of a melamine-based hardener, a urethane-based hardener, an aliphatic polyamine hardener, a modified aliphatic polyamine hardener, an aromatic polyamine hardener, and an organic acid anhydride hardener.

The aliphatic polyamine hardener may include diethylenetriamine, triethylenetetramine, and the like. The modified aliphatic polyamine hardener may include epoxy polyamine, oxyethylene polyamine, and the like. The aromatic polyamine hardener may include meta-phenylenediamine, diaminodiphenylmethane, diaminopediphenylsulfone, and the like. The organic acid anhydride-based hardener may include tetrahydrophthalic anhydride, pyromellitic anhydride, and the like.

In addition to the above-described resin and hardener, a metal phosphate and a metal crontrim salt may be further included.

The lower adhesive layer 30 is positioned on the lower surface of the electrical steel sheet 10.

The lower adhesive layer 30 includes a resin having a hydroxyl group equivalent of 15 to 20 mgKOH/g. When the resin includes an appropriate amount of a hydroxyl group, and when manufacturing a laminate 100 by laminating the electrical steel sheet 10, adherence to the upper adhesive layer 20 may be improved. At the same time, it is possible to prevent scratch-type defects in the production line during production of the lower adhesive layer 30. In the production of electrical steel sheet, a roll and the lower surface contact each other to be transferred. In this case, when the hydroxyl group equivalent of the lower adhesive layer 30 is too low, a larger number of scratch-type defects may occur.

The lower adhesive layer 30 may include a resin having a weight average molecular weight of 1000 to 10,000. When a resin with an appropriate molecular weight is included, adherence to the upper adhesive layer 20 may be improved. When the weight average molecular weight is too low, the adherence to the upper adhesive layer 20 may be deteriorated. When the weight average molecular weight is too high, a large number of scratch-type defects may occur. More specifically, the lower adhesive layer 30 may include a resin having a weight average molecular weight of 1500 to 5000. More specifically, the lower adhesive layer 30 may include a resin having a weight average molecular weight of 2000 to 3000.

The lower adhesive layer 30 may further include 5 to 10 wt % of a hardener. When too much hardener is included, the adherence to the upper adhesive layer 20 may be deteriorated. When too little hardener is included, a large number of scratch-type defects may occur. The balance, excluding the hardener, may be the resin. Specifically, the hardener may be included in an amount of 5 to 8 wt %.

The lower adhesive layer 30 may have a pencil hardness of H or more. Here, the pencil hardness may be measured by visually checking presence or absence of an indentation on a surface of a coating layer by drawing a line at a 45 degree angle with a load of 500 g by using a standard pencil. The highest hardness that does not cause the indentation is a hardness of the adhesive layer. Specifically, the lower adhesive layer 30 may have a pencil hardness of H to 4H. More specifically, the lower adhesive layer 30 may have a pencil hardness of H to 3H.

The kind of resin is not particularly limited. For example, the resin may include one or more of an epoxy-based resin, a siloxane-based resin, an acryl-based resin, a phenolic resin, a styrene-based resin, a vinyl-based resin, an ethylene-based resin, an ester-based resin, and a urethane-based resin. More specifically, it may include one or more of an epoxy-based resin, an ester-based resin, a urethane-based resin, and an acryl-based resin. It may be the same as or different from the resin of the above-described upper adhesive layer 20.

The hardener may include one or more of a melamine-based hardener, a urethane-based hardener, an aliphatic polyamine hardener, a modified aliphatic polyamine hardener, an aromatic polyamine hardener, and an organic acid anhydride hardener. It may be the same as or different from the hardener of the above-described upper adhesive layer 20.

In addition to the above-described resin and hardener, a metal phosphate and a metal crontrim salt may be further included.

Thicknesses of the upper adhesive layer 20 and the lower adhesive layer 30 may be 1 to 10 μm, respectively.

A manufacturing method of an electrical steel sheet according to an embodiment of the present invention includes forming an upper adhesive layer by applying an upper adhesive composition to an upper surface of an electrical steel sheet, and forming a lower adhesive layer by applying a lower adhesive composition to a lower surface of the electrical steel sheet.

Hereinafter, the respective steps will be specifically described.

The upper adhesive composition is applied to the upper surface of the electrical steel sheet 10 to form the upper adhesive layer 20.

The upper adhesive composition includes a resin having a hydroxyl group equivalent of 1 to 10 mgKOH/g. When the resin includes an appropriate amount of a hydroxyl group, and when manufacturing the laminate 100 by laminating the electrical steel sheet 10, the adherence to the lower adhesive layer 30 may be improved. By improving the adherence, it is possible to bond the electrical steel sheets without using conventional fastening methods such as welding, clamping, and interlocking, and magnetism is improved because no deformation is added to the steel sheets.

When the hydroxyl group equivalent is too high, the adherence to the lower adhesive layer 30 may be deteriorated. When the hydroxyl group equivalent is too low, a defect may occur in which the upper adhesive layer 20 and the lower adhesive layer 30 are adhered by coil winding after production of the product. Specifically, the upper adhesive composition may include a resin having a hydroxyl equivalent of 3 to 5 mgKOH/g. In this case, the hydroxyl group (—OH) equivalent means a weight of a hydroxyl group (—OH) to a weight of the resin, and 1 g of a dried solid content is obtained from a weight of KOH required to neutralize an acid value that may be acetylated.

The upper adhesive composition may include a resin having a weight average molecular weight of 15,000 to 50,000. When a resin with an appropriate molecular weight is included, the adherence to the lower adhesive layer 30 may be improved. When the weight average molecular weight is too high, a defect may occur in which the upper adhesive layer 20 and the lower adhesive layer 30 are adhered by coil winding after production of the product. More specifically, the upper adhesive composition may include a resin having a weight average molecular weight of 20,000 to 40,000.

The upper adhesive composition may further include 3 wt % or less of the hardener with respect to 100 wt % of the solid content. The hardener may be 0 wt %, that is, it may not be included. When too much hardener is included, the adherence to the lower adhesive layer 30 may be deteriorated. The balance, excluding the hardener, may be the resin. More specifically, the hardener may not be included. That is, the solid content of the upper adhesive composition may be composed of only resin. The upper adhesive composition may further include a solvent in addition to the solid content. As the solvent, a general solvent used for a coating composition may be used, and a detailed description thereof will be omitted. For example, the solvent may include one or more of water and an organic solvent.

The kind of resin is not particularly limited. For example, the resin may include one or more of an epoxy-based resin, a siloxane-based resin, an acryl-based resin, a phenolic resin, a styrene-based resin, a vinyl-based resin, an ethylene-based resin, an ester-based resin, and a urethane-based resin. More specifically, it may include one or more of an epoxy-based resin, an ester-based resin, a urethane-based resin, and an acryl-based resin.

The hardener may include one or more of a melamine-based hardener, a urethane-based hardener, an aliphatic polyamine hardener, a modified aliphatic polyamine hardener, an aromatic polyamine hardener, and an organic acid anhydride hardener.

After the upper adhesive composition is applied, it is cured to form the upper adhesive layer 20. This step may be performed in a temperature range of 100 to 300° C. to cure the adhesive coating composition. The characteristics (hydroxyl group equivalent, weight average molecular weight) of the components in the upper adhesive composition before and after the curing are substantially unchanged.

The lower adhesive composition is applied to the lower surface of the electrical steel sheet 10 to form the lower adhesive layer 30. The forming of the above-described upper adhesive layer 20 and the forming of the lower adhesive layer 30 may be configured regardless of their sequence. That is, after the forming of the upper adhesive layer 20, the lower adhesive layer 30 may be formed, and after the forming of the lower adhesive layer 30, the upper adhesive layer 20 may be formed. It is also possible to simultaneously form the upper adhesive layer 20 and the adhesive layer 30.

The lower adhesive composition includes a resin having a hydroxyl group equivalent of 15 to 20 mgKOH/g. When the resin includes an appropriate amount of a hydroxyl group, and when manufacturing the laminate 100 by laminating the electrical steel sheet 10, the adherence to the upper adhesive layer 20 may be improved. At the same time, it is possible to prevent scratch-type defects in the production line during production of the lower adhesive layer 30. In the production of the electrical steel sheet, a roll and the lower surface contact each other to be transferred. In this case, when the hydroxyl group equivalent of the lower adhesive composition is too low, a larger number of scratch-type defects may occur.

The lower adhesive composition may include a resin having a weight average molecular weight of 1000 to 10,000. When a resin with an appropriate molecular weight is included, the adherence to the upper adhesive layer 20 may be improved. When the weight average molecular weight is too low, the adherence to the upper adhesive layer 20 may be deteriorated. When the weight average molecular weight is too high, a large number of scratch-type defects may occur. Specifically, the lower adhesive composition may include a resin having a weight average molecular weight of 1500 to 5000. More specifically, the lower adhesive composition may include a resin having a weight average molecular weight of 2000 to 3000.

The lower adhesive composition may further include 5 to 10 wt % of the hardener with respect to 100 wt % of the solid content. When too much hardener is included, the adherence to the upper adhesive layer 20 may be deteriorated. When too little hardener is included, a large number of scratch-type defects may occur. The balance, excluding the hardener, may be the resin. Specifically, the hardener may be included in an amount of 5 to 8 wt %. The lower adhesive composition may further include a solvent in addition to the solid content. As the solvent, a general solvent used for a coating composition may be used, and a detailed description thereof will be omitted. For example, the solvent may include one or more of water and an organic solvent.

The kind of resin is not particularly limited. For example, the resin may include one or more of an epoxy-based resin, a siloxane-based resin, an acryl-based resin, a phenolic resin, a styrene-based resin, a vinyl-based resin, an ethylene-based resin, an ester-based resin, and a urethane-based resin. More specifically, it may include one or more of an epoxy-based resin, an ester-based resin, a urethane-based resin, and an acryl-based resin. It may be the same as or different from the resin of the above-described upper adhesive composition.

The hardener may include one or more of a melamine-based hardener, a urethane-based hardener, an aliphatic polyamine hardener, a modified aliphatic polyamine hardener, an aromatic polyamine hardener, and an organic acid anhydride hardener. It may be the same as or different from the hardener of the above-described upper adhesive composition.

After the lower adhesive composition is applied, it is cured to form the lower adhesive layer 30. This step may be performed in a temperature range of 100 to 300° C. to cure the adhesive coating composition. The characteristics (hydroxyl group equivalent, weight average molecular weight) of the components in the lower adhesive composition before and after the curing are substantially unchanged.

Figure 2:
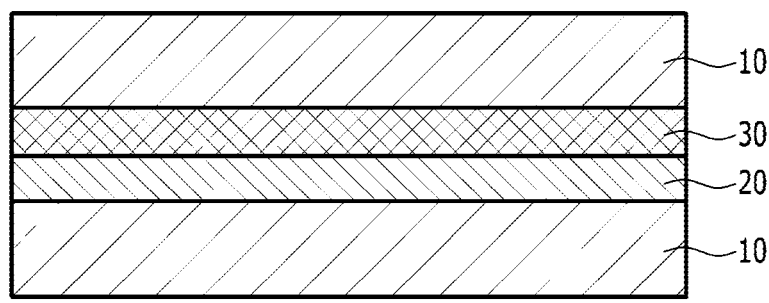
FIG. 2 illustrates a schematic view of a cross-section of an electrical steel sheet laminate according to an embodiment of the present invention.

FIG. 2 illustrates a schematic cross-sectional view of an electrical steel sheet laminate according to an embodiment of the present invention. A structure of an electrical steel sheet laminate according to an embodiment of the present invention will be described with reference to FIG. 2. However, the electrical steel sheet laminate of FIG. 2 is only for illustrating the present invention, and the present invention is not limited thereto. Therefore, a structure of the electrical steel sheet laminate may be variously modified.

As shown in FIG. 2, in the electrical steel sheet laminate 100 according to the embodiment of the present invention, a plurality of electrical steel sheets 10 are laminated, and the upper adhesive layer 20 and the lower adhesive layer 30 are interposed in an order between the electrical steel sheets.

Since the electrical steel sheet 10, the upper adhesive layer 20, and the lower adhesive layer 30 are the same as those of the electrical steel sheet 10 described above, a duplicate description thereof will be omitted.

The manufacturing method of the electrical steel sheet laminate 100 includes laminating a plurality of the electrical steel sheets 10 on which the upper adhesive layer 20 and the adhesive layer 30 are formed, and thermal-bonding them. Through the thermal-bonding, the resin components in the upper adhesive layer 20 and the lower adhesive layer 30 are thermal-bonded to form a thermal-bonding layer.

The thermal-bonding may be performed under conditions of a temperature of 100 to 300° C., a pressure of 0.05 to 5.0 MPa, and 0.1 to 120 minutes. The conditions may each independently be satisfied, and two or more conditions may be simultaneously satisfied. By controlling the conditions of the temperature, the pressure, and the time in the thermal-bonding as described above, the non-oriented electrical steel sheets may be densely thermal-bonded without gaps or pores therebetween.

The thermal-bonding includes increasing a temperature and bonding, and a temperature increase rate in the increasing of the temperature may be 10° C./min to 1000° C./min.

As described above, the electrical steel sheet laminate according to the embodiment of the present invention not only improves magnetism of the electrical steel sheet itself (specifically, iron loss, magnetic flux density, etc.), but also has excellent adhesion by the adhesive coating layer.

Hereinafter, the present invention will be described in more detail through examples. However, the examples are only for illustrating the present invention, and the present invention is not limited thereto.

Examples

A non-oriented electrical steel sheet (50×50 mm) including 3.15 wt % of silicon (Si) and subjected to an annealing treatment to a sheet thickness of 0.35 mm was prepared as a blank specimen. The adhesive composition composed of the solid contents summarized in Table 1 below was applied to the upper and lower portions of each prepared blank specimen by using a bar coater to have a predetermined thickness, and it was cured at a standard 150 to 250° C. for 20 seconds, and then slowly cooled in air to form an adhesive coating layer having a thickness of about 3.0 μm.

After the electrical steel sheet coated with the adhesive coating layer was laminated to a height of 20 mm, it was pressurized with a pressure of 0.1 MPa and thermal-bonded at 120° C. for 10 minutes. The adherence of the electrical steel sheet thermal-bonded under each condition was measured by the shear surface tension method.

Adherence; After the specimen prepared by the shear strength was fixed to upper/lower jigs with a certain force, the adherence was measured by using a device that measures the tensile force of the stacked samples while pulling them at a constant speed. At this time, in the case of the shear strength, the measured value was a value measured at the point at which the interface with the minimum adherence was peel out among the interfaces of the laminated samples.

Surface hardness: As a method of measuring the surface hardness of the coating layer, the pencil hardness measurement method is used. An indentation on the surface of the coating layer is visually checked by drawing a line at an angle of 45 degrees with a standard pencil (Mitsubishi pencil, 8B to 10H) with a load of 500 g.

TABLE 1

| | Upper adhesive layer | | | | Lower adhesive layer | | | |
|---|---|---|---|---|---|---|---|---|
| Classification | Resin content (wt %) | Resin molecular weight | hydroxyl group equivalent (mgKOH/g) | Hardener content (wt %) | Resin content (wt %) | Resin molecular weight | hydroxyl group equivalent (mgKOH/g) | Hardener content (wt %) |
| Example 1 | 100 | 20,000 | 3 | 0 | 95 | 3000 | 15 | 5 |
| Example 2 | 100 | 40,000 | 5 | 0 | 92 | 2000 | 20 | 8 |
| Comparative Example 1 | 100 | 20,000 | 3 | 0 | 100 | 20,000 | 3 | 0 |
| Comparative Example 2 | 95 | 3000 | 15 | 5 | 95 | 3000 | 15 | 5 |
| Comparative Example 3 | 95 | 3000 | 15 | 5 | 100 | 20,000 | 3 | 0 |
| Comparative Example 4 | 100 | 20,000 | 3 | 0 | 85 | 3000 | 25 | 15 |
| Comparative Example 5 | 100 | 60,000 | 0.5 | 0 | 95 | 3000 | 15 | 5 |

TABLE 2

| | Pencil hardness | | | |
|---|---|---|---|---|
| Classification | Upper adhesive layer | Lower adhesive layer | Adherence (MPa) | Lower scratch |
| Example 1 | F | H | 1.5 | X |
| Example 2 | F | 3H | 1.1 | X |
| Comparative Example 1 | F | F | 1.7 | Multiple occurrence |
| Comparative Example 2 | 2H | 2H | 0.7 | X |
| Comparative Example 3 | 2H | F | 1.5 | Multiple occurrence |
| Comparative Example 4 | F | 5H | 0.6 | X |
| Comparative Example 5 | 2B | 2H | 1.6 | X |

As shown in Table 1 and Table 2, it can be confirmed that the surface characteristics and adherence of Example 1 and Example 2 were excellent.

On the other hand, it can be seen that, as in Comparative Example 1, when the upper and lower surfaces were configured with the same hydroxyl group equivalent, molecular weight, and content of the hardener to have the soft hardness, the shear adherence after the thermal-bonding was excellent, but the surface hardness of the coating layer on the lower surface was deteriorated, so that a number of scratch-type defects occurred.

As in Comparative Example 2, when the upper and lower surfaces were configured with the same hydroxyl group equivalent, molecular weight, and content of the hardener to have the hard hardness, no scratch-type defects occurred, but the shear adherence was deteriorated after the thermal-bonding.

It can be seen that when the properties of the adhesive layer of the upper and lower surfaces were reversed as in Comparative Example 3, the shear adherence after the thermal-bonding was excellent, but the surface hardness of the coating layer on the lower surface was deteriorated, so that a number of scratch-type defects occurred.

As in Comparative Example 4, when the hardness of the adhesive layer was too high, the scratch-type defects did not occur, but the shear adherence was deteriorated after the thermal-bonding.

As in Comparative Example 5, when the hardness of the upper adhesive layer was too low, the defect occurred in which the upper and lower adhesive layers were adhered by coil winding after production of the product.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

DESCRIPTION OF SYMBOLS

10: electrical steel sheet
20: upper adhesive layer
30: lower adhesive layer
40: electrical steel sheet laminate

The invention claimed is:

1. An electrical steel sheet comprising:
an upper adhesive layer positioned on an upper surface of an electrical steel sheet; and
a lower adhesive layer positioned on a lower surface of the electrical steel sheet,
wherein the upper adhesive layer has a pencil hardness of F or lower, and
the lower adhesive layer has a pencil hardness of H or higher.

2. The electrical steel sheet of claim 1, wherein
the upper adhesive layer includes a resin having a weight average molecular weight of 15,000 to 50,000, and
the lower adhesive layer includes a resin having a weight average molecular weight of 1000 to 10,000.

3. The electrical steel sheet of claim 1, wherein
the upper adhesive layer further includes a hardener of 3 wt % or less, and
the lower adhesive layer further includes a hardener of 5 to 10 wt %.

4. The electrical steel sheet of claim 1, wherein
the upper adhesive layer includes a resin having a hydroxyl group equivalent of 1 to 10 mgKOH/g, and
the lower adhesive layer includes a resin having a hydroxyl group equivalent of 15 to 20 mgKOH/g.

5. The electrical steel sheet of claim 1, wherein
each of the resins included in the upper adhesive layer and the lower adhesive layer includes one or more of an epoxy-based resin, a siloxane-based resin, an acryl-based resin, a phenolic resin, a styrene-based resin, a vinyl-based resin, an ethylene-based resin, an ester-based resin, and a urethane-based resin.

6. The electrical steel sheet of claim 3, wherein
each of the hardeners included in the upper adhesive layer and the lower adhesive layer includes one or more of a melamine-based hardener, a urethane-based hardener, an aliphatic polyamine hardener, a modified aliphatic polyamine hardener, an aromatic polyamine hardener, and an organic acid anhydride hardener.

7. A manufacturing method of an electrical steel sheet, comprising:
applying an upper adhesive composition to an upper surface of an electrical steel sheet to form an upper adhesive layer; and
applying a lower adhesive composition to a lower surface of the electrical steel sheet to form a lower adhesive layer,
wherein the upper adhesive composition includes a resin having a hydroxyl group equivalent of 1 to 10 mgKOH/g, and
the lower adhesive composition includes a resin having a hydroxyl group equivalent of 15 to 20 mgKOH/g.

8. The manufacturing method of the electrical steel sheet of claim 7, wherein
the upper adhesive composition includes a resin having a weight average molecular weight of 15,000 to 50,000, and
the lower adhesive composition includes a resin having a weight average molecular weight of 1000 to 10,000.

9. The manufacturing method of the electrical steel sheet of claim 7, wherein
the upper adhesive composition further includes 3 wt % or less of a hardener with respect to 100 wt % of a solid content, and
the lower adhesive composition further includes 5 to 10 wt % of a hardener with respect to 100 wt % of a solid content.

10. An electrical steel sheet laminate in which a plurality of electrical steel sheets are stacked, and an upper adhesive layer and a lower adhesive layer are interposed in an order between the electrical steel sheets,
wherein the upper adhesive layer has a pencil hardness of F or lower, and
the lower adhesive layer has a pencil hardness of H or higher.

11. The electrical steel sheet of claim 10, wherein
the upper adhesive layer includes a resin having a weight average molecular weight of 15,000 to 50,000, and
the lower adhesive layer includes a resin having a weight average molecular weight of 1000 to 10,000.

12. The electrical steel sheet of claim 10, wherein
the upper adhesive layer further includes a hardener of 3 wt % or less, and
the lower adhesive layer further includes a hardener of 5 to 10 wt %.

13. The electrical steel sheet of claim 10, wherein
the upper adhesive layer includes a resin having a hydroxyl group equivalent of 1 to 10 mgKOH/g, and
the lower adhesive layer includes a resin having a hydroxyl group equivalent of 15 to 20 mgKOH/g.

* * * * *